March 3, 1953     A. I. APPLETON     2,630,339
ELECTRICAL CONNECTOR
Filed Aug. 6, 1948
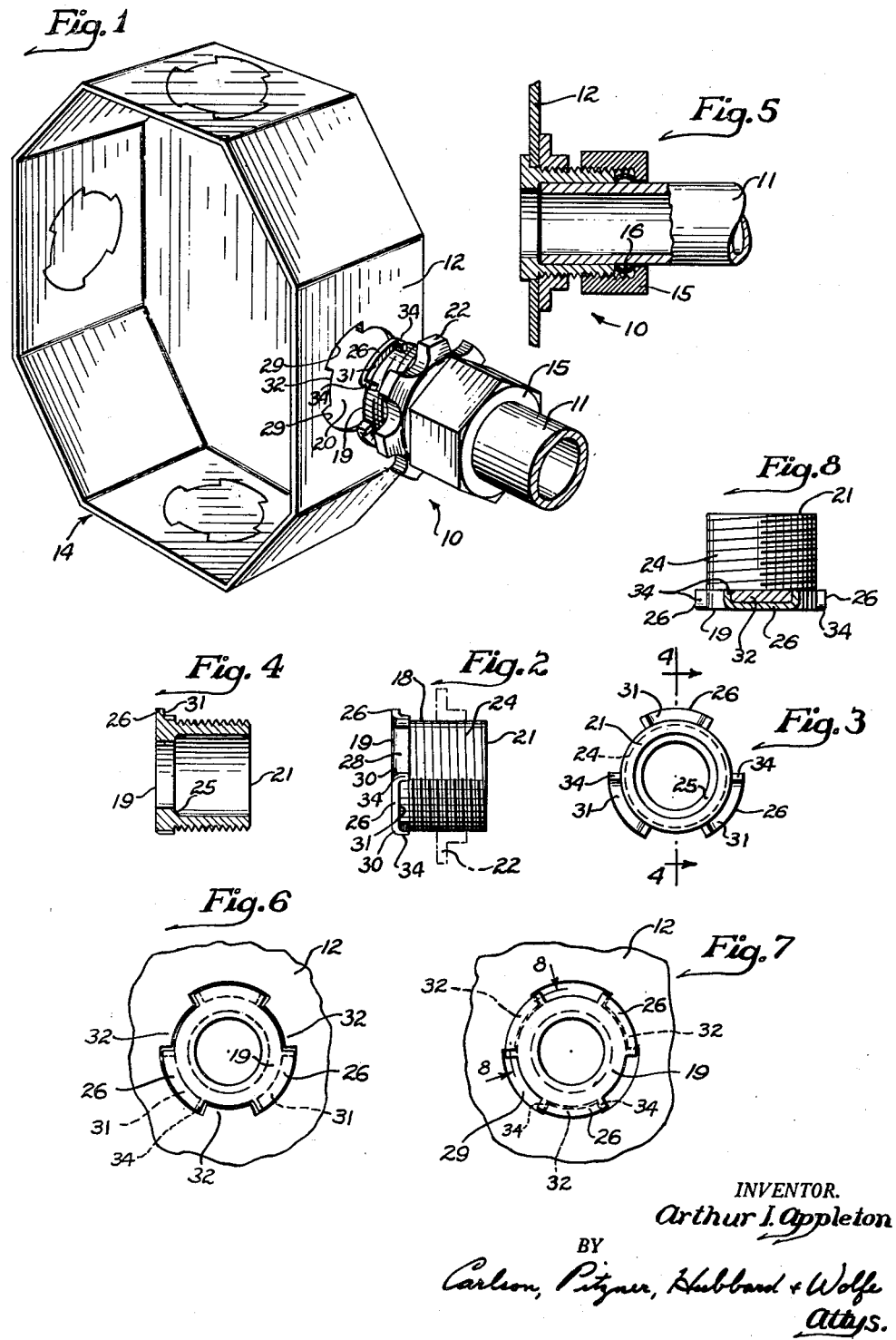
INVENTOR.
Arthur I. Appleton
BY
Carlton, Pitzner, Hubbard & Wolfe
Attys.

Patented Mar. 3, 1953

2,630,339

UNITED STATES PATENT OFFICE 2,630,339

ELECTRICAL CONNECTOR

Arthur I. Appleton, Chicago, Ill., assignor to Appleton Electric Company, Chicago, Ill., a company of Illinois Application August 6, 1948, Serial No. 42,985

2 Claims. (Cl. 285—6.5)

The present invention pertains generally to fittings for connecting pipe or conduit to fixed anchorages, and more specifically to a novel connector for use in securing electrical conduit to junction boxes, outlet boxes, and the like.

One object of the invention is to provide an electrical connector which will be susceptible of quick and easy installation from the exterior of a box of the above type.

Another object is to provide a connector of the foregoing character which, once installed, will remain securely in place with little if any likelihood of disengagement.

A further object is to provide a connector of the type set forth and which will have a relatively large area of electrical contact with the box wall so as to preserve the ground continuity of the conduit system.

Still another object is to provide a connector of the above character which will be simple, reliable and susceptible of economical manufacture.

Further objects and advantages will become apparent as the following description proceeds, taken in connection with the accompanying drawings wherein:

Figure 1 is a perspective view of an illustrative connector embodying the invention, such view taken immediately prior to installation of the connector in the knockout opening of a junction box wall.

Fig. 2 is a side elevational view of the connector shown in Fig. 1, the clamping nut being indicated in dot-dash outline.

Fig. 3 is a view of the right-hand end of the connector shown in Fig. 2.

Fig. 4 is a longitudinal sectional view through the connector of Fig. 2, taken in the plane of the line 4—4 in Fig. 3.

Fig. 5 is a longitudinal sectional view through the connector of Fig. 1 as installed in the junction box and with a section of conduit clamped thereto.

Figs. 6 and 7 are fragmentary views of the inner face of the junction box wall showing the relationship between the edge contour of the knockout opening and the peripheral shape of the connector bushing.

Fig. 8 is a fragmentary sectional view through engaged portions of the box wall and the connector, such view being taken in the plane of the arc 8—8 in Fig. 7.

While the invention is susceptible of various modifications and alternative constructions, a preferred embodiment has been shown in the drawings and will be described below in considerable detail. It should be understood, however, that there is no intention to limit the invention to the specific form disclosed, but on the contrary, the intention is to cover all modifications and alternative constructions falling within the spirit and scope of the invention as expressed in the appended claims.

Referring in greater detail to the drawings, the invention is there exemplified in an illustrative connector 10 adapted in this instance to secure a length of thin walled conduit 11 to the side wall 12 of a junction box 14. The conduit 11 may be fastened to the connector 10 in any convenient manner as, for example, by the use of a shoulder nut 15 and a pressure ring 16.

The connector 10 comprises a hollow body (Figs. 2 and 3) in the form of a relatively short bushing 18 having a nose end 19 adapted for insertion into a generally circular knockout opening 20 in the box wall 12, and in addition has a nut end 21 which projects outwardly from the box wall when the connector is mounted in place. To receive a connector clamping nut 22 as well as the shoulder nut 15, the bushing 18 is fashioned with external threads 24 running along a substantial portion of its length. Internally, the bushing 18 is formed with a stepped axial bore adjacent the nose end 19 defining a stop shoulder 25 for the end of the conduit 11.

To achieve positive engagement between the connector 10 and the box wall 12, the bushing 18 is provided in the present instance with one or more radially projecting teeth 26 preferably of generally segmental shape. In the illustrative connector 10, three of the teeth 26 are formed integral with the bushing 18, being located in circumferentially spaced relation upon an unthreaded annular portion 28 of the latter adjacent the nose end 19. Thus when the connector 10 is installed in the opening 20, the teeth 26 serve to engage the interior face of the box wall 12 in opposition to the thrust of the clamping nut 22 against the exterior face of the box wall.

In order to permit insertion of the nose end of the bushing 18 from the exterior of the junction box 14, the edges of the wall opening 20 are suitably notched to provide clearance for the teeth 26 on the connector bushing. Referring more specifically to Figs. 1, 6 and 7, it will be perceived that this is accomplished in the present instance by means of a series of segmental notches 29 spaced circumferentially about the periphery of the opening 20 for registration with the teeth 26. To facilitate passage of the bushing 18 into the opening 20 and thus shorten the time required for installation of the connector 10, the ends of the teeth 26 immediately adjacent the nose of the bushing may be relieved as by rounding off at 30 (Fig. 2) instead of terminating in sharp corners.

Means is provided for obtaining locking engagement between the box wall 12 and the bushing 18 after insertion of the latter into the opening 20, such engagement taking place upon rotation of the bushing through a fraction of a turn followed by a slight axial movement of the same away from the junction box. This is accomplished in part by forming each of the teeth 26 with a segmental or arcuate notch 31 running the full radial height of the tooth and located on the side adjacent the threaded portion of the bushing 18 (see Figs. 1 and 2). In the present instance, this gives each tooth a substantial C-shape. Locking engagement between the bushing 18 and the box wall 12 is also achieved in part by the relative proportioning between the arcuate lengths of the teeth 26, the segmental or arcuate tooth notches 31, and lands 32 defined in the edges of the opening 20 by the notches 29. The segmental tooth notches 31 and the lands 32 are of complementary form, the lands 32 being of appropriate size to enter into the tooth notches 31 upon registration therewith and slight axial movement of the connector 10 away from the box 14. On the other hand, both the notches 31 and the lands 32 must be of sufficiently smaller arcuate length than the teeth 26 to leave a substantial amount of stock in each of the axially running end portions 34 at the extremities of the teeth 26.

By the use of the foregoing construction, the connector 10 can be installed on the box 14 quickly, simply, and economically. Starting with the connector in the position of Fig. 1, with the teeth 26 disposed for registration with the notches 29, the nose end 19 of the connector bushing can be inserted into the opening 20 until the clamping nut 22 abuts the outer face of the box wall 12. Subsequent rotation of the connector through a fraction of a turn will bring about registration between the notches 31 of the teeth 26 and the lands 32 of the box wall. A slight axial movement of the connector 10 away from the box 14 will thereupon cause the teeth 26 to nestingly receive and lockingly embrace the lands 32 due to entry of the latter into the notches 31 of the teeth. Upon tightening of the clamping nut 22 against the outer surface of the box wall 12, the connector bushing 18 becomes positively locked against rotation, the axially extending end portions 34 of the teeth squarely abutting adjacent radial end faces of the lands 32.

External torque on the installed connector 10, occasioned, for example, by tightening down on the shoulder nut 15 to clamp the conduit 11 in place, is resisted at a number of points spaced circumferentially about the respective peripheries of the bushing 18 and the opening 20. On the bushing 18, torque is resisted at each end portion 34 of the teeth 26, the principal stresses involved acting in two mutually perpendicular shear areas, one circumferential and the other radial with respect to the bushing. At the box wall, on the other hand, the torque is resisted by the substantial circumferential shear area at the root of each of the lands 32.

As will be appreciated by those skilled in the art, the connector 10 possesses a number of advantages over the conventional types. Since it can be installed from the exterior of the junction or outlet box without removal of the clamping nut 22, installation time and costs are materially reduced. Moreover, the ease with which the connector can be slipped into place, coupled with the fact that there is no need to apply a clamping nut inside the box, makes the device easy to install even under the low temperatures experienced in a partially completed building during cold weather. The substantial area of electrical contact between the connector and the box wall serves to preserve the ground continuity of any conduit system in which the connector 10 may be used, a factor of primary importance regardless of the size of such system. Due to the fact that the box wall opening required by the connector 10 is of generally circular form and of comparable size to the usual knockout opening of a conventional box, a junction or outlet box designed for use with connectors embodying the invention will readily accommodate conventional type connectors. Thus it is possible to use the connector 10 in existing installations as well as in new construction.

I claim as my invention:

1. An electrical connector adapted for mounting in the knock-out opening of a box wall by insertion from the exterior of the box, such knock-out opening having a set of circumferentially spaced notches defining therebetween a corresponding set of lands of lesser arcuate length than the notches, said connector comprising, in combination, a hollow body having an externally threaded portion and an unthreaded external portion, a plurality of radially projecting teeth integral with the unthreaded portion of said body and circumferentially spaced for registration with and insertion through the notches of the knock-out opening, said teeth having a unit arcuate length slightly less than the unit arcuate length of the knock-out opening notches but substantially greater than the unit arcuate length of the lands, said teeth also having relieved lateral edges to facilitate registration with the notches, each said tooth also having an arcuate notch on the side adjacent said threaded portion of said body and complementary in form to a corresponding one of the lands of the knock-out opening, said arcuate tooth notches being adapted to mesh complementally with respective ones of the lands, and a clamping nut adapted to secure said connector body with the arcuate tooth notches and the lands in complementally meshed condition to preclude rotation and withdrawal of said connector from the knock-out opening.

2. An electrical connector susceptible of attachment to a box having a knock-out opening with a segmental land projecting radially therein, said connector comprising, in combination, a bushing having an externally threaded portion and an unthreaded external portion, a segmental tooth projecting radially from said unthreaded external portion of said bushing, said tooth having an intermediate portion extending circumferentially of said bushing and terminating in end portions extending longitudinally of said bushing and defining an arcuate notch on the side adjacent the threaded portion of said bushing, such arcuate notch being complementary to the land in the knock-out aperture and adapted to mesh with the land, each said end portion of said tooth having inner surfaces extending radially and longitudinally of said bushing and susceptible of abutting engagement with the lateral edges of the land upon being brought into coplanar relation with the same, and a clamping nut disposed in threaded engagement with said bushing for urging the same outwardly of the knock-out aperture and maintaining said tooth notch and the land in coplanar meshed engagement.

ARTHUR I. APPLETON.

REFERENCES CITED

The following references are of record in the file of this patent:

UNITED STATES PATENTS

| Number | Name | Date |
|---|---|---|
| 982,535 | Rudkiewick | Jan. 24, 1911 |
| 1,030,237 | Hall | June 18, 1912 |
| 1,542,703 | Kirkham | June 16, 1925 |
| 1,849,206 | Sater | Mar. 15, 1932 |
| 1,902,229 | Goerzelman | Mar. 21, 1933 |
| 2,255,673 | McDermott | Sept. 9, 1941 |
| 2,425,545 | Lefebre | Aug. 12, 1947 |